US007339895B2

United States Patent
Ozaki et al.

(10) Patent No.: US 7,339,895 B2
(45) Date of Patent: Mar. 4, 2008

(54) GATEWAY DEVICE AND CONTROL METHOD FOR COMMUNICATION WITH IP AND IPV6 PROTOCOLS

(75) Inventors: Tomochika Ozaki, Yokohama (JP); Tadashi Kuwabara, Yokohama (JP); Isao Nakagawa, Yokohama (JP); Hiromichi Ito, Yokohamai (JP)

(73) Assignee: Hitachi, Ltd., Tokyo (JP)

( * ) Notice: Subject to any disclaimer, the term of this patent is extended or adjusted under 35 U.S.C. 154(b) by 990 days.

(21) Appl. No.: 10/199,291

(22) Filed: Jul. 19, 2002

(65) Prior Publication Data

US 2004/0071148 A1 Apr. 15, 2004

(30) Foreign Application Priority Data

Aug. 21, 2001 (JP) ............................. 2001-249741
Sep. 11, 2001 (JP) ............................. 2001-274427

(51) Int. Cl.
H04L 12/26 (2006.01)
H04L 12/28 (2006.01)
H04J 3/16 (2006.01)

(52) U.S. Cl. ...................... 370/252; 370/389; 370/466
(58) Field of Classification Search ................ 370/352, 370/401, 466, 252, 389, 392
See application file for complete search history.

(56) References Cited

U.S. PATENT DOCUMENTS

| | | | | |
|---|---|---|---|---|
| 5,861,906 A * | 1/1999 | Dunn et al. | | 725/87 |
| 5,864,542 A * | 1/1999 | Gupta et al. | | 370/257 |
| 6,005,861 A * | 12/1999 | Humpleman | | 370/352 |
| 6,118,784 A * | 9/2000 | Tsuchiya et al. | | 370/401 |
| 6,121,593 A * | 9/2000 | Mansbery et al. | | 219/679 |
| 6,181,326 B1 * | 1/2001 | Takahashi | | 345/158 |
| 6,182,094 B1 * | 1/2001 | Humpleman et al. | | 715/513 |
| 6,198,479 B1 * | 3/2001 | Humpleman et al. | | 715/733 |
| 6,243,707 B1 * | 6/2001 | Humpleman et al. | | 707/102 |
| 6,288,716 B1 * | 9/2001 | Humpleman et al. | | 715/733 |
| 6,466,971 B1 * | 10/2002 | Humpleman et al. | | 709/220 |
| 6,845,091 B2 * | 1/2005 | Ogier et al. | | 370/388 |
| 6,850,149 B2 * | 2/2005 | Park | | 340/7.1 |
| 6,870,555 B2 | 3/2005 | Sekiguchi | | |
| 6,950,433 B1 * | 9/2005 | Okamoto | | 370/392 |
| 6,957,275 B1 | 10/2005 | Sekiguchi | | |
| 6,959,009 B2 * | 10/2005 | Asokan et al. | | 370/475 |
| 2002/0073244 A1 * | 6/2002 | Davies et al. | | 709/328 |
| 2002/0075259 A1 * | 6/2002 | Wendorf et al. | | 709/328 |
| 2003/0147417 A1 * | 8/2003 | Seo | | 370/466 |
| 2003/0193965 A1 * | 10/2003 | Higuchi et al. | | 370/466 |
| 2005/0271034 A1 * | 12/2005 | Asokan et al. | | 370/349 |

FOREIGN PATENT DOCUMENTS

JP 2000-295246 A 10/2000
JP 2001-7861 1/2001

* cited by examiner

*Primary Examiner*—Wing Chan
*Assistant Examiner*—Hong Sol Cho
(74) *Attorney, Agent, or Firm*—Townsend and Townsend and Crew LLP

(57) ABSTRACT

A non-IP device holds an interface ID defined by Ipv6. A gateway generates and holds an Ipv6 address for the non-IP device. The gateway serves to convert the protocol of a packet destined to the non-IP device from a portable telephone or a personal computer coupled to an internet into the protocol for a network connected to the non-IP device and transmit the packet to the non-IP device.

6 Claims, 15 Drawing Sheets

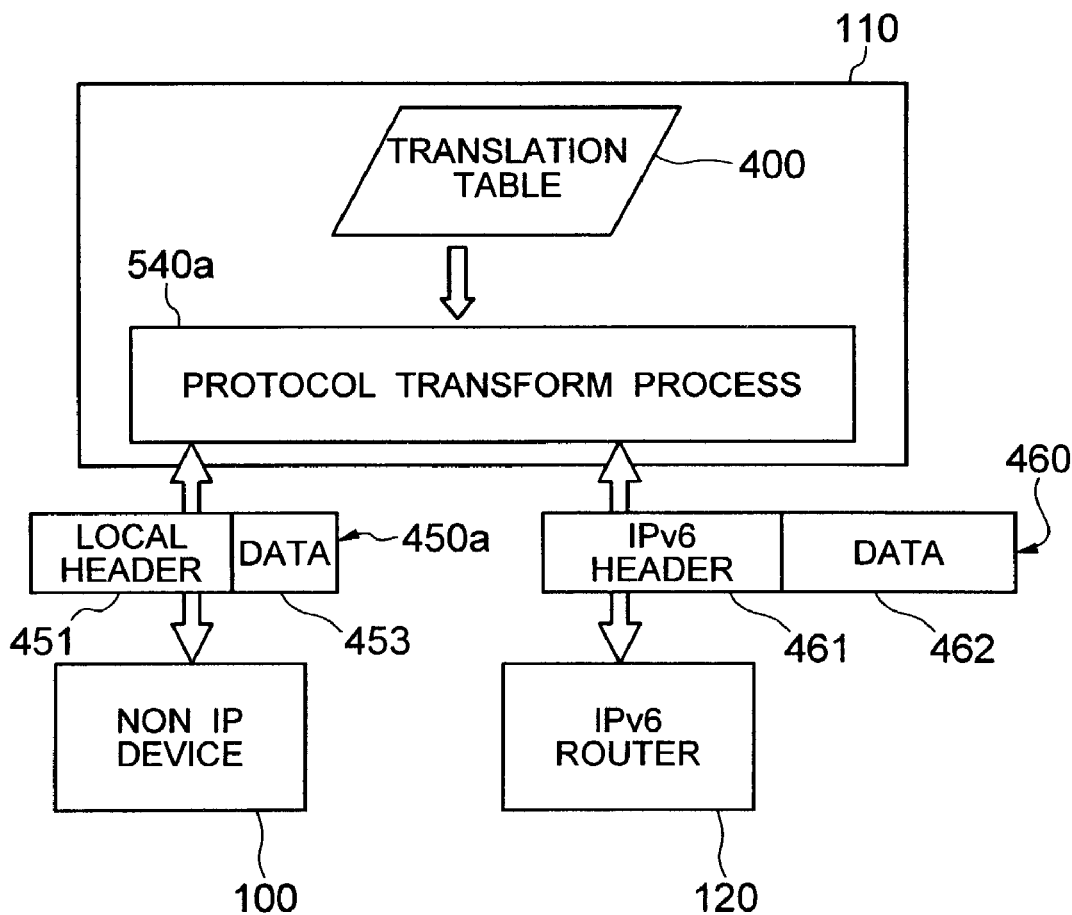

GATEWAY DEVICE AND CONTROL METHOD FOR COMMUNICATION WITH IP AND IPV6 PROTOCOLS

BACKGROUND OF THE INVENTION

The present invention relates to a gateway device for converting a communication protocol and more particular, to a gateway device which is suitable when conversion between different types of communication protocols different in their address systems is carried out and to a method for controlling the gateway device.

In a communication field, in these years, an IP protocol as an Internet standard protocol is becoming the de facto standard. Even in homes, the IP protocol is being used. However, there are so many devices which does not support the IP protocol. As a device for enabling communication of such a device not supporting the IP protocol with an IP-protocol supported device, there is a gateway device, an example of which is disclosed in JP-A-2001-007861 corresponding to EP 1063829A2. In JP-A-2001-007861, an HAVi (Home audio/video interoperability) device connected to an IEEE 1394 network can communicate with a device connected to an IP network via the gateway device.

SUMMARY OF THE INVENTION

In the aforementioned technique, in order for an HAVi device connected to a gateway to look like a virtual IP device, a combination of an IP address and a port number is used as its IP identifier. Further, since the IP address employs an IP address applied to the gateway, identifiers of HAVi devices connected to the same gateway have all an identical IP address but have different port numbers for their distinction. For this reason, there is a problem that the aforementioned techniques requires such an IP address control different from the standard control as to identify devices by IP addresses designated to the respective devices and to identify the services of the devices by their port numbers.

That is, since the above technique uses a combination of an IP address and a port number as the IP identifier of an HAVi device connected to the gateway in order to cause the HAVi device to look like a virtual IP device, there is a problem that, regardless of the connection or disconnection of the HAVi device to the gateway, the HAVi device is recognized as being always connected in an IP address level and an actual connection or disconnection state can be recognized first after an access in a port level is carried out.

It is therefore an object of the present invention to provide a gateway device which can assign an unique IP address even to a device (which will be referred to as the non-IP device, hereinafter) connected to a network (which will be referred to as the non-IP network, hereinafter) other than the IP function network and can communicate with a device (which will be referred to as the IP device, hereinafter) connected to an IP network.

When communication is required to be realized with use of a gateway between networks based on communication protocols using different bit numbers of node addresses, there is a problem that it is easy to convert the destination address of a communication packet to be sent from a device in the network based on the communication protocol using an address of a more number of bits to a device in the network based on the communication protocol using an address of a less number of bits, but it is hard to convert it conversely because of a possibility of address overlap.

It is therefore an object of the present invention to provide a gateway device which enable easy communication between networks based on communication protocols using different bit numbers of node addresses, and also to provide a method for controlling the gateway device.

In order to solve the above problems, in accordance with the present invention, there is provided a system which includes a non-IP device connected to a non-IP network and a gateway device connected to both of an Ipv6 network and the non-IP network, and wherein the non-IP device has a unit for holding an IPv6 interface ID and a unit for transmitting the interface ID and a network identifier as an identifier on the network having the IP device connected therein. And the gateway device has a device information acquisition unit for receiving the interface ID and network identifier received from the non-IP device. Further the gateway device has an network ID acquisition unit for acquiring the network ID of the IP network having the gateway device connected thereto. The network ID acquisition unit is arranged to generate an IPv6 address from the network ID acquired by the network ID acquisition unit and from the interface ID acquired by the device information acquisition unit. And the gateway device also has an address translation unit which controls a correspondence relation between the generated IPv6 address and the network identifier acquired by the device information acquisition unit.

Further, the gateway device is arranged to examine whether or not the IPv6 address designated by a target address in a neighbor solicitation (NS) packet of a neighbor discovery protocol (NDP) prescribed by IPv6 when receiving the NS packet is present in the IPv6 address controlled by the address translation unit. In the case of the presence of the IPv6 address, the gateway device returns a neighbor advertisement (NA) packet.

The gateway device further has a unit for converting the IP packet received from the IP network to a non-IP network protocol packet and sending the converted protocol to the non-IP device and a unit for converting non-IP data received from the non-IP network to an IP protocol packet and sending the converted IP protocol packet to the IP network, whereby the non-IP device and IP device can communicate with each other. In this case, data to communicate between the gateway device and non-IP device contains the IPv6 address of the IP device as a communication destination, whereby the IP device can be identified by the non-IP device.

In accordance with the present invention, further, when the non-IP device connected to the non-IP network is removed from the non-IP network, this also causes removal of the correspondence relation between the IPv6 address controlled by the address translation unit and the network identifier acquired by the device information acquisition unit.

In another embodiment, there is provided a system which includes a non-IP device connected to a non-IP network and a gateway device connected to both of an IPv6 network and the non-IP network. The non-IP device has a unit for holding identifier information (device identifier information) of the device and a unit for the device identifier information and an network identifier as an identifier on the network having the non-IP device connected therein. And the gateway device has a device information acquisition unit for receiving the device identifier information from the non-IP device and the network identifier. The gateway device further has a network ID acquisition unit for acquiring the network ID of the IP network having the gateway device connected thereto, and generate a plurality of IPv6 addresses with use of the network ID acquired by the network ID acquisition unit. The gateway device also has an address translation unit for allocating one of the generated IPv6 addresses with use of the device identifier information acquired by the device information acquisition unit thereto and for managing its correspondence relation. In the address or translation, an identical IPv6 address is always allocated to devices having the same device identifier information.

Furthermore, the gateway device is arranged to examine whether or not the IPv6 address specified by the target address within an NS packet of the NDP prescribed by the IPv6 when receiving the NS packet is present in the IPv6 address managed by the address translation unit. In the presence of the IPv6 address, the gateway device returns an NA packet.

The gateway device also has a unit for converting the IP packet received from the IP network to a non-IP network protocol and transmitting the converted protocol to the non-IP device and a unit for converting non-IP data received from the non-IP network to an IP protocol to enable mutual communication between the non-IP device and IP device. In this case, the IPv6 address of an IP device as a communication destination is included in data to be transferred between the gateway device and non-IP device so that the IP device can be identified by the non-IP device.

Other objects, features and advantages of the invention will become apparent from the following description of the embodiments of the invention taken in conjunction with the accompanying drawings.

BRIEF DESCRIPTION OF THE DRAWINGS

FIG. 19 is a diagram for explaining the summary of the protocol transform process in the embodiment of the present invention;

FIG. 20 is a diagram for explaining the data structure of the translation table in the embodiment of the present invention;

DESCRIPTION OF THE EMBODIMENTS

Figure 1:
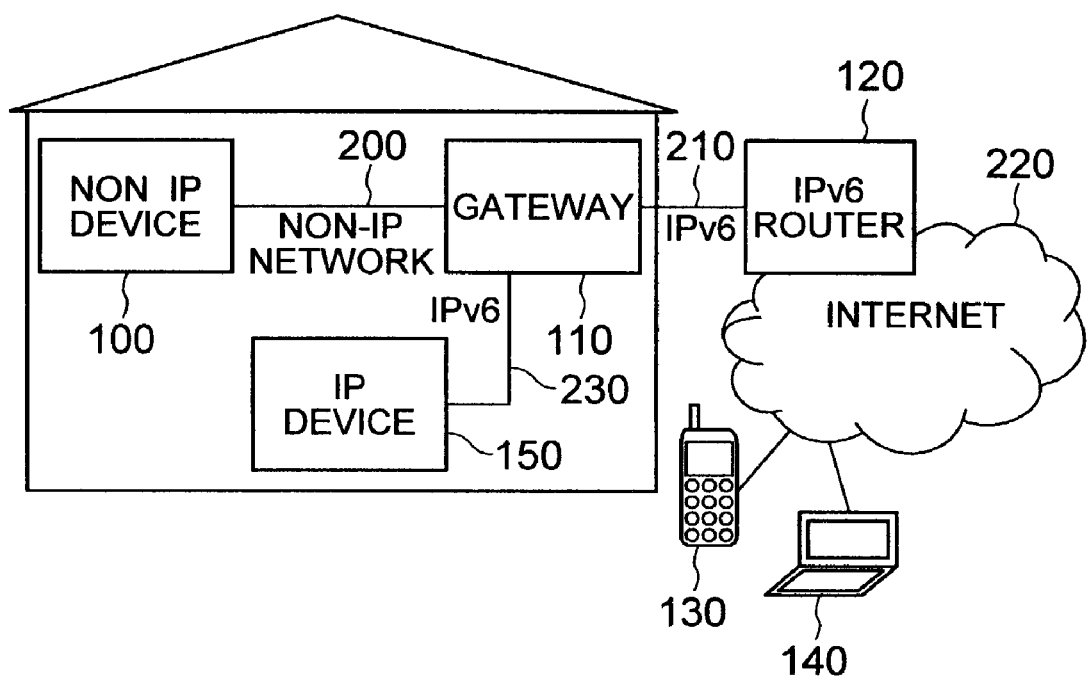
FIG. 1 schematically shows an embodiment of the present invention.

An embodiment of the present invention will be explained with reference to the accompanying drawings. Explanation will first be made as to the summary of the present invention by referring to FIG. 1. In FIG. 1, reference numeral 100 denotes a non-IP device. The word "non-IP device" as used herein means to a device which does not support the IPv6 (Internet protocol version 6) but is connected to some network. Examples of the non-IP device 100 include a refrigerator or an air conditioner connected to the ECHONET. Numeral 110 denotes a gateway. The gateway 110 is connected to the non-IP device 100 via a non-IP network 200. Examples of the non-IP network 200 include ECHONET. The gateway 110 is connected to an IPv6 router 120 iv an IPv6 network 210. The IPv6 router 120 is connected to the Internet 220. The gateway is further connected to an IPv6 device 150 via an IPv6 network 230. Examples of the IPv6 device 150 include a personal computer.

The present invention is directed to a system configured with such devices and networks as mentioned above, which provides a mechanism for realizing communication between a device (e.g., a portable phone 130 or a personal computer (PC) 140) or the IPv6 device 150 in a home and the non-IP device 100 (such as a refrigerator, air conditioner, microwave oven) in the home. In this connection, although explanation will be made in connection with a case where the gateway 110 and IPv6 router 120 are provided as separated devices in the foregoing embodiment, these devices may be combined into a single device having the two functions without any trouble. Explanation will be made in connection with a case where an air conditioner is used as the non-IP device 100 and the ECHONET is used as the IPv6 device 150. However, it goes without saying that, in the present invention, the non-IP device and non-IP network are not limited to those devices.

Figure 2:
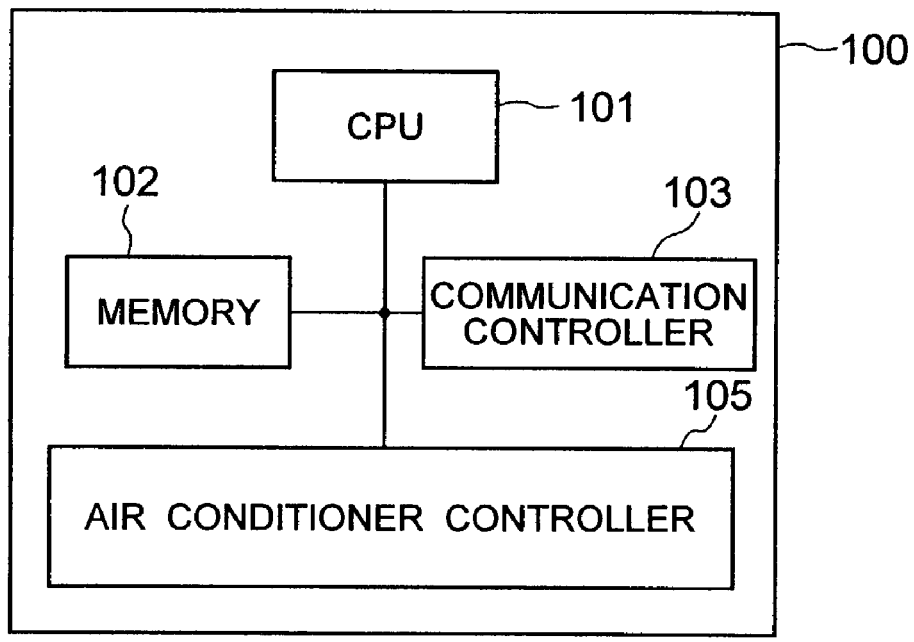
FIG. 2 is a block diagram of a hardware structure of a non-IP device in the embodiment of the present invention.

Explanation will next be made as to the hardware structure of each device. In this connection, since the IPv6 router 120, portable phone 130, PC 140 and IPv6 device 150 are ordinary well-known devices, explanation thereabout is omitted. Explanation will first be made as to the hardware structure of the non-IP device 100 by referring to FIG. 2. In the drawing, reference numeral 101 denotes a CPU which controls peripheral devices and executes various types of programs relating to data processing and communication. Numeral 102 denotes a memory such as a ROM (read only memory), RAM (random access memory) or flash memory. The memory stores therein various types of programs to be used in the present embodiment or data on an interface ID, etc. to be explained later. Numeral 103 denotes a communication controller which controls, for example, communication via the ECHONET. Numeral 104 denotes an air conditioner which controls the operation of the air conditioner.

Figure 3:
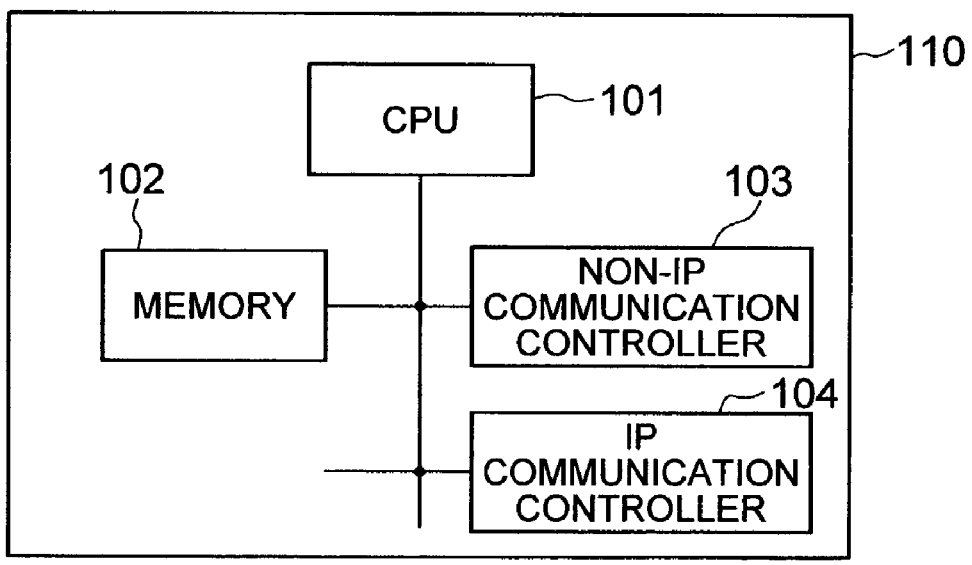
FIG. 3 is a block diagram of a hardware structure of a gateway in the embodiment of the present invention.

Explanation will next be made as to the hardware structure of the gateway 110 with reference to FIG. 3. In the drawing, reference numeral 111 denotes a CPU which controls its peripheral devices and executes various types of programs relating to data processing or communication. Numeral 112 denotes a main memory such as a ROM (read only memory), RAM (random access memory) o, flash memory or hard disk. The main memory stores therein various types of programs to be used in the present embodiment or data about a translation table to be explained later. Numeral 103 denotes a non-IP communication controller which control, for example, communication via the ECHO-NET. Numeral 104 denotes an IP communication controller which controls communication using the IPv6.

Figure 4:
FIG. 4 is a diagram for explaining the data structure of an interface ID in the embodiment of the present invention.

Next explanation will be made as to an interface ID 450 possessed by the non-IP device 100 by referring to FIG. 4. The interface ID is data of 64 bits which is used to identify the device. In this connection, how to assign the interface ID is prescribed in IEEE, "Guidelines for 64-bit Global Identifier (EU1-64) Registration Authority". In the non-IP device 100, the interface ID 440 is held in the memory 102.

Figure 5:
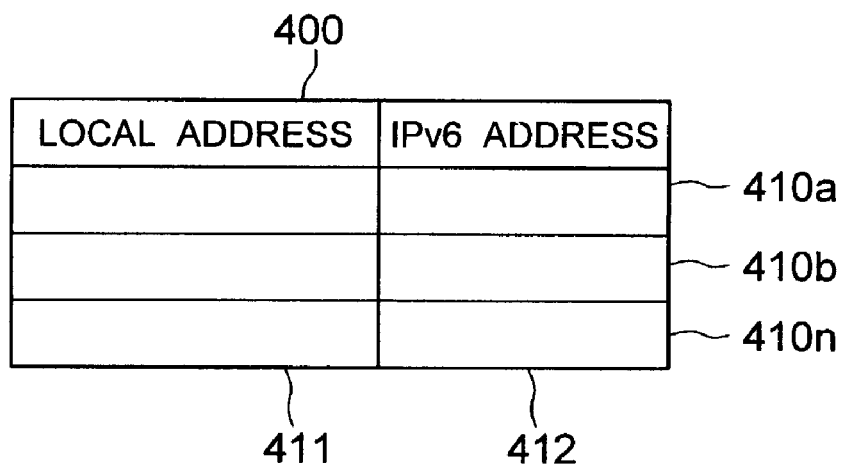
FIG. 5 is a diagram for explaining the data structure of a translation table in the embodiment of the present invention.

A translation table 400 held by the gateway will be explained with reference to FIG. 5. The translation table 400 is used to make correspondence of an identifier (local address) of the non-IP device 100 on the non-IP network 200 to the IPv6 address allocated to the non-IP device 100. The translation table 400 is made up of one or more translation records 410. Each translation record 410 is constituted of a local address 411 and an IPv6 address 412. The local address 411 us an identifier for uniquely identifying a device connected to the non-IP network 200, and corresponds to an ECHONET address in the case of the ECHONET. Stored in the IPv6 address 412 is an IPv6 address of 128 bits.

Figure 6:
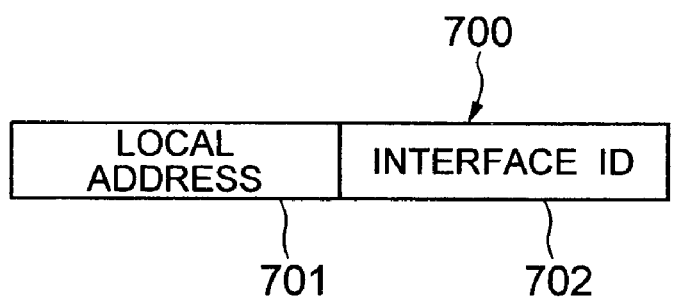
FIG. 6 is a diagram for explaining the data structure of registered data in the embodiment of the present invention.

Explanation will next be made as to registration data 700 transmitted to the gateway 110 when the non-IP device 100 is connected to the non-IP network 200 (or at any timing), by referring to FIG. 6. The registration data 700 is composed of a local address 701 and an interface ID 702. The local address 701 is the identifier of the non-IP device 100 for the registration data 700, and corresponds to the ECHONET address in the case of the ECHONET. Further, the interface ID 702 is the same as the interface ID 440 held by the non-IP device 100.

Figure 7:
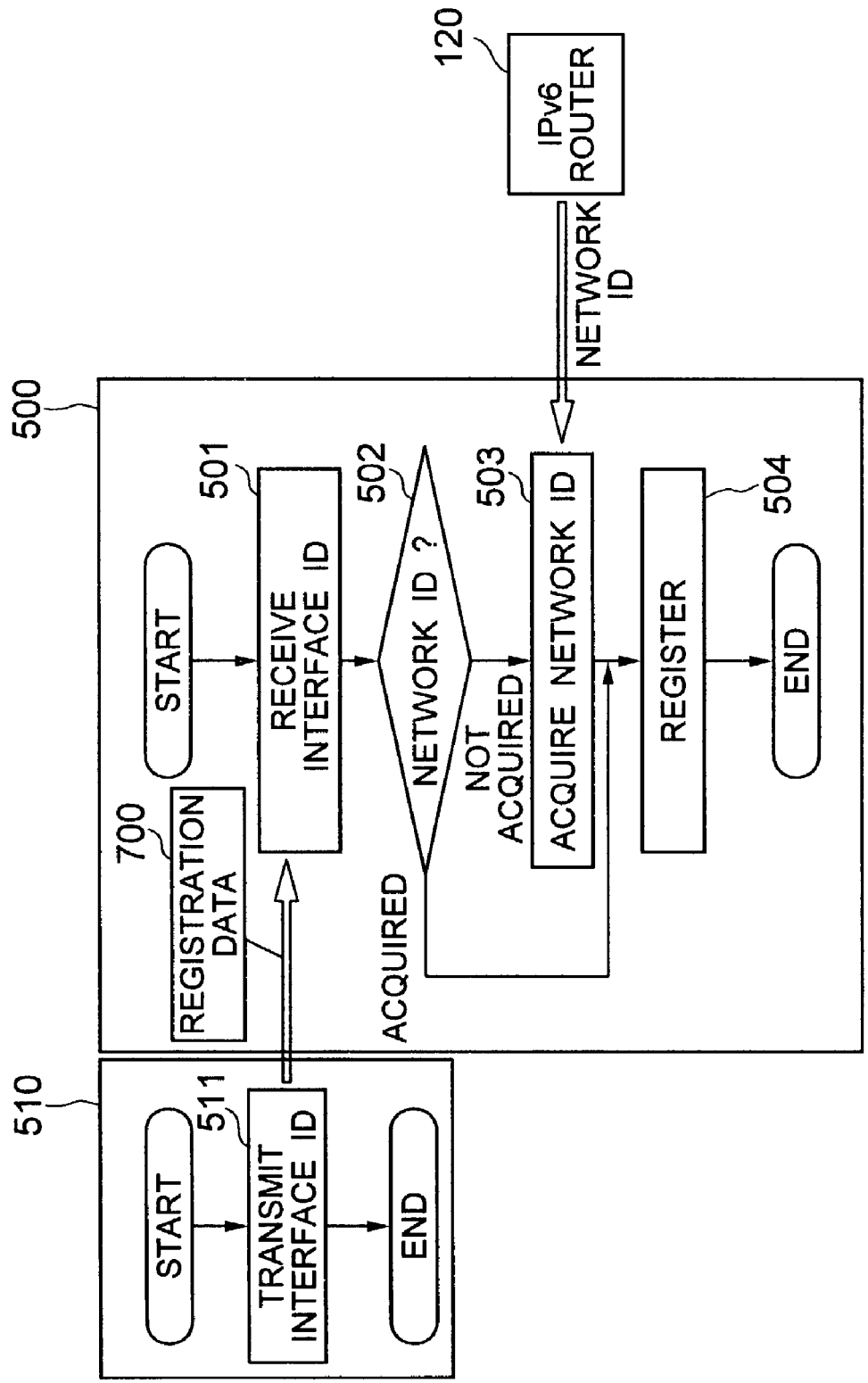
FIG. 7 is a flowchart showing a registration process in the embodiment of the present invention.

Explanation will then be made as to a registration process to be carried out when the non-IP device 100 is connected to the non-IP network 200 (or at any timing), by referring to FIG. 7. The registration process includes an interface ID transmission process 510 in the non-IP device 100 and a translation table registration process 500 in the gateway 110. The non-IP device 100 executes the interface ID transmission process 510 when connected to the non-IP network (or at any timing). In the interface ID transmission process 510, the interface ID 440 recorded in the memory 102 is read out therefrom and set in the interface ID 702 of the registration data 700. Further, the local address of the non-IP device 100 is acquired, e.g., from the communication controller 103 and set in the local address 701 of the registration data 700. And the registration data 700 is transmitted as addressed to the gateway 110 (step 511).

The gateway 110, when detecting the transmission of the interface ID from the non-IP device 100, initiates the translation table registration process 500. In the translation table registration process 500, the gateway first receives the registration data 700 sent from the non-IP device 100 (step 501). Next, the gateway judges whether or not to have already received the network ID in the IPv6 (step 502). When the gateway fails to receive the network ID in the IPv6, the gateway acquires the network ID from the portable phone 130 and stores it in the main memory 112. When the gateway already receives network ID, the gateway proceeds to a step 504. The gateway generates an IPv6 address on the basis of the interface ID 702 of the registration data 700 received in the step 501 or the network ID acquired in the step 503 or the network ID previously acquired and held in the main memory 112. And the translation records 410 having the local address 701 of the registration data 700 received in the step 501 set in the local address 411 and having the generated IPv6 address set in the IPv6 address 412 respectively is added in the translation table 400 (step 504).

Through the above operations, the gateway 110 can allocate the IPv6 address to the non-IP device 100. At this time, the gateway acquires the interface ID from the non-IP device 100. Thus, so long as the gateway 110 is connected to the same IP network (that is, so long as the network ID of the IP network having the gateway 110 connected thereto is not changed), the gateway can allocate the same IPv6 at all times.

Explanation will next be made as to how the non-IP device 100 transmits and receives data to and from the IPv6 device 150 in the home or from the portable phone 130 or PC 140 connected to the Internet. Data from the portable phone 130 or personal computer 140 connected to the Internet 220 reaches the IPv6 router 120. Thus explanation will be made herein as to how the IPv6 router 120 transmits the data to the gateway 110. In this connection, even when the IPv6 device 150 in the home communicates with the non-IP device 100, the IPv6 router 120 works in the same manner as the above.

For IPv6 communication data (IPv6 packet), its destination is specified in the form of an IPv6 address. Accordingly, in order that the IPv6 router 120 transmits data to the non-IP device 100 connected to the gateway 110, the address (Ethernet address) of the lower layer of the IPv6 becomes necessary. In the IPv6, a method for finding the address of the lower layer of the IPv6 is NDP (neighbor discovery protocol). Details of the NDP is described in RFC 2461, Neighbor Discovery for IP Version 6 (IPv6). When the gateway 110 responds to the NDP, the IPv6 packet addressed to the non-IP device 100 connected to the gateway 110 can reach the gateway 110.

Figure 8:
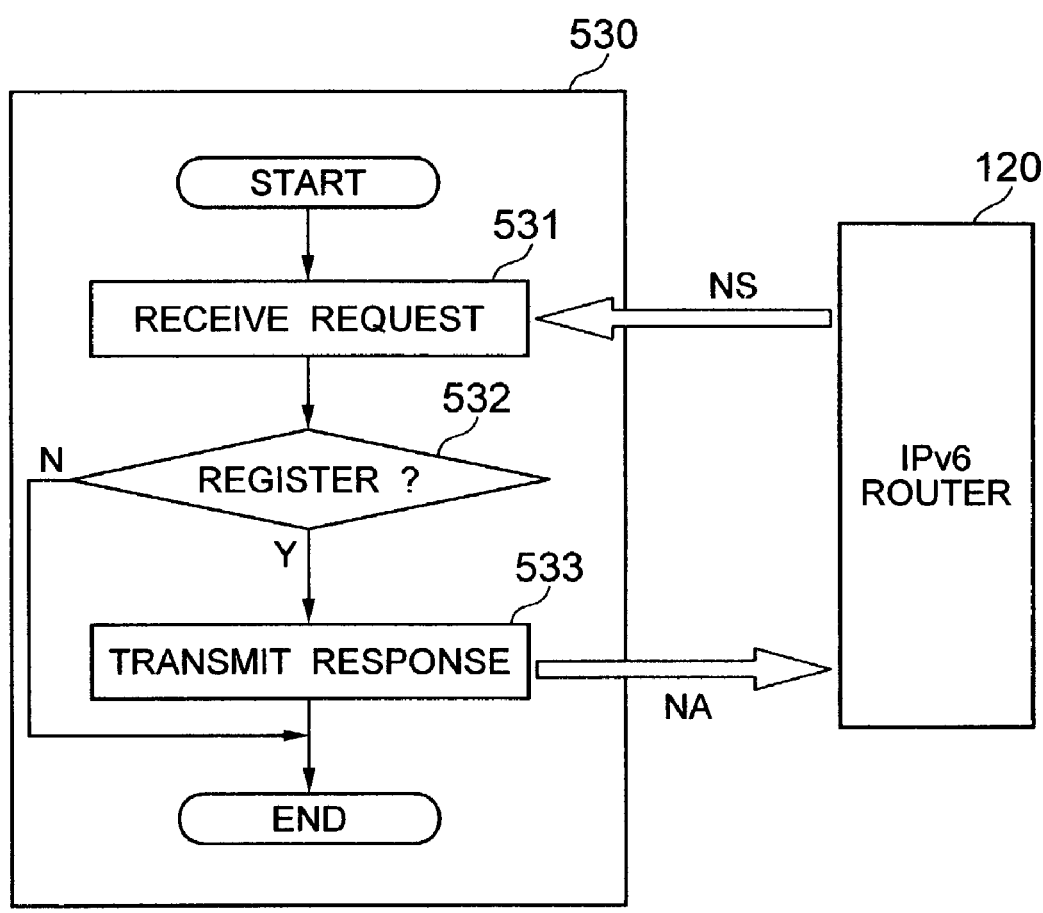
FIG. 8 is a flowchart showing an NDP response process in the embodiment of the present invention.

Explanation will be made as an NDP response process 530 of the gateway 110 relating to the NDP, with use of a flowchart of FIG. 8. The NDP response process 530 is initiated when the gateway 110 detects an NS (neighbor solicitation) packet of the NDP. In the NDP response process 530, the gateway first receives an NS packet (step 531). The gateway then examines whether or not the translation record 410 having the same IPv6 address 412 as the IPv6 address specified by the target address of the NS packet is present in the translation table 400 (step 532). In the case of the presence of the translation record, the gateway 110 sets the address of the lower layer of the IP communication controller 104 of the gateway 110 in neighbor advertisement) and transmits it the transmission source of the NS packet (step 533). In the case of absence of the translation record, the gateway does nothing.

Through the above operations, the gateway 110 in place of the non-IP device 100 can respond to the NDP and the IPv6 packet directed to the non-IP device 100 can be arrived at the gateway 110. The gateway transmits the packet to the non-IP device 100 with use of the protocol of the non-IP network 200. Explanation will be made below as to the protocol transform process with use of FIG. 9.

When the non-IP device 100 communicates with the IPv6 device 150 in the home or with the portable phone 130 or PC 140 connected to the Internet, two types of communication data which follow are used. Explanation will first be made as to a local data packet 450 as the first data to be transferred between the gateway 110 and non-IP device 100. The local data packet 450 is composed of a local header 451, an IPv6 address 452 and data 453. The local header 451 is information which includes, for example, an ECHONET header, a transmission source address and a party destination address in the ECHONET. The IPv6 address 452 is the IPv6 address of a communication destination device (e.g., the IPv6 device 150 in the home or the portable phone 130 or PC 140 connected to the Internet). The data 453 includes information about transfer between the non-IP device 100 and communication destination device.

Explanation will next be made as to an IPv6 data packet 460 as the second data to be transferred between the gateway 110 and the IPv6 device 150 or portable phone 130. The IPv6 data packet 460 is composed of an IPv6 header 461 and data 462. The IPv6 header, which is a header prescribed by the IPv6 protocol, includes a transmission destination IPv6 address and a transmission source IPv6 address. The data 462 includes information about transfer between the non-IP device 100 and communication destination device.

In a protocol transform process 540, two types of data conversions mentioned above are carried out. More specifically, the local data packet 450 received from the non-IP network 200 is converted to the IPv6 data packet 460 and transmitted to the IPv6 network 210 and IPv6 network 230 (protocol transform process 550). The IPv6 data packet 460 received from the IPv6 network 210 or IPv6 network 230 is converted to the local data packet 450 and transmitted to the non-IP network 200 (protocol transform process 560).

In this connection, correspondence relation between the IPv6 data packet 460 and local data packet 450 is not necessarily limited to 1:1. For example, conversion may be carried out in units of HTTP (hypertext transfer protocol) request message or HTTP response message. Further, a plurality of IPv6 data packets 460 may be combined into a single local data packet 450. A single IPv6 data packet 460 may be divided into a plurality of local data packets 450. Furthermore, a plurality of local data packets 450 may be combined into a single IPv6 data packet 460. A single local data packet 450 may be divided into a plurality of IPv6 data packets 460. In addition, the data and local data packet 450 included in the IPv6 data packet 460 may contain respectively processed data.

Figure 10:
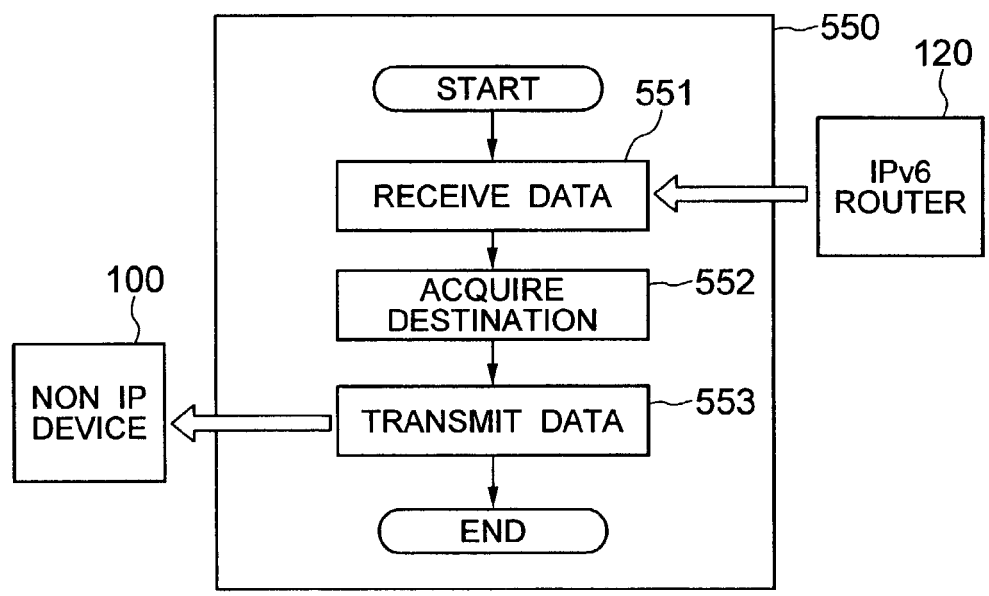
FIG. 10 is a flowchart showing the protocol transform process in the embodiment of the present invention.

A protocol transform process 550 from the IPv6 data packet 460 to the local data packet 450 will next be detailed with use of a flowchart of FIG. 10. The protocol transform process 550 is initiated when the gateway 110 receives the IPv6 data packet 460.

In the protocol transform process 550, the gateway first reads the arrived IPv6 data packet 460 (step 551). The gateway then searches the translation table 400 for the translation record 410 having the same IPv6 address 412 as the destination IPv6 address included in the IPv6 header 461 of the read IPv6 data packet 460, and reads out the local address 411 of the translation record 410 therefrom (step 552). Next, the gateway sets the local address read out in the step 552 in the local header 451 of the local data packet 450 as an destination address, and also sets the transmission source IPv6 address of the received IPv6 data packet 460 in the IPv6 address 452 of the local data packet 450. And the gateway stores data containing at least part of the data 462 of the IPv6 data packet 460 or the data 462 obtained by processing the data 462 in the data 453 of the local data packet 450 (step 553).

Figure 11:
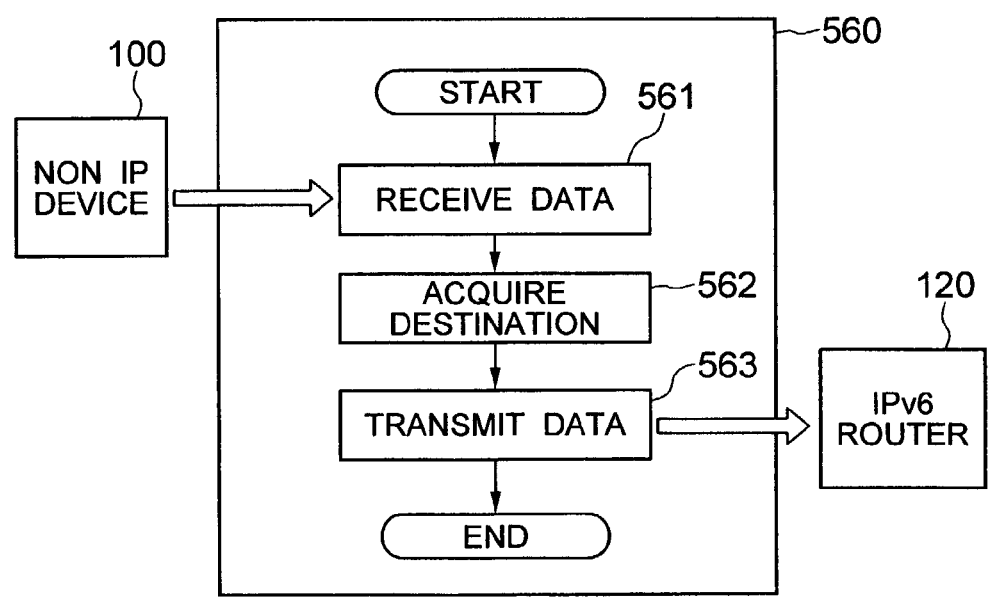
FIG. 11 is a flowchart showing the protocol transform process in the embodiment of the present invention.

The protocol transform process 560 from the local data packet 450 to the IPv6 data packet 460 will be detailed with use of a flowchart of FIG. 11. The protocol transform process 560 is initiated when the gateway 110 receives the local data packet 450.

In the protocol transform process 560, the gateway first reads the arrived local data packet 450 (step 561). The gateway then sets the IPv6 address 452 of the local data packet read in the step 561 in the IPv6 header 461 of the IPv6 data packet 460 as a destination (step 562). And the gateway stores data including at least part of the data 453 of the local data packet 450 or data obtained by processing the data 453 in the data 462 of the IPv6 data packet, and transmits it to the IPv6 network 210 or IPv6 network 230 (step 563).

Through the above operations, mutual communication can be realized between the non-IP device 100 connected to the non-IP network 200 and the IPv6 device 150 connected to the IPv6 network or the portable phone 130 or personal computer 140 connected to the Internet. At this time, the interface ID transmission process 510 and translation table registration process 500 in the gateway 110 cause an identical IPv6 address to be always allocated to the non-IP device 100. Therefore, when an access is made to the non-IP device 100 in the home from the IPv6 device 150 connected to the IPv6 network or from the portable phone 130 or personal computer 140 connected to the Internet, the communication can advantageously be realized using always the same IPv6 address.

Figure 12:
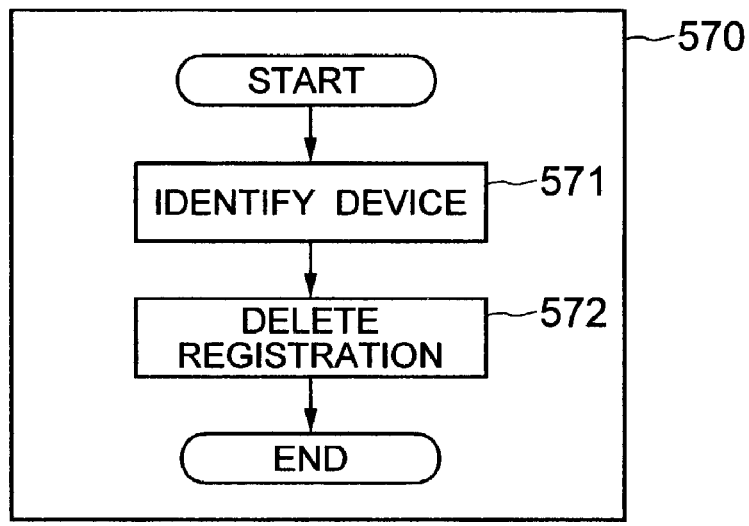
FIG. 12 is a flowchart showing a registration delete process in the embodiment of the present invention.

Explanation will next be made as to a registration delete process 570 to be carried out by the gateway 110 when the non-IP device 100 connected to the non-IP network 200 is removed from the non-IP network 200, by referring to FIG. 12.

In the registration delete process 570, the gateway first identifies the local address of the removed non-IP device 100 (step 571). In this connection, methods for detecting the local address of the removed non-IP device 100 include a method for examining whether or not the local addresses 411 of all the translation records 410 in the translation table 400 are connected to the non-IP network 200, and a method for informing the gateway that the non-IP device 100 is going to be removed, immediately before the non-IP device 100 is removed from the non-IP network 200. Next, the gateway deletes the translation record 410 having the local address identified in the step 571 from the translation table 400 (step 572).

Through the above operations, since information on the non-IP device 100 removed from the non-IP network 200 is deleted from the translation table 400, it becomes unnecessary for the non-IP device 100 to transmit data to the removed non-IP device 100.

Figure 13:
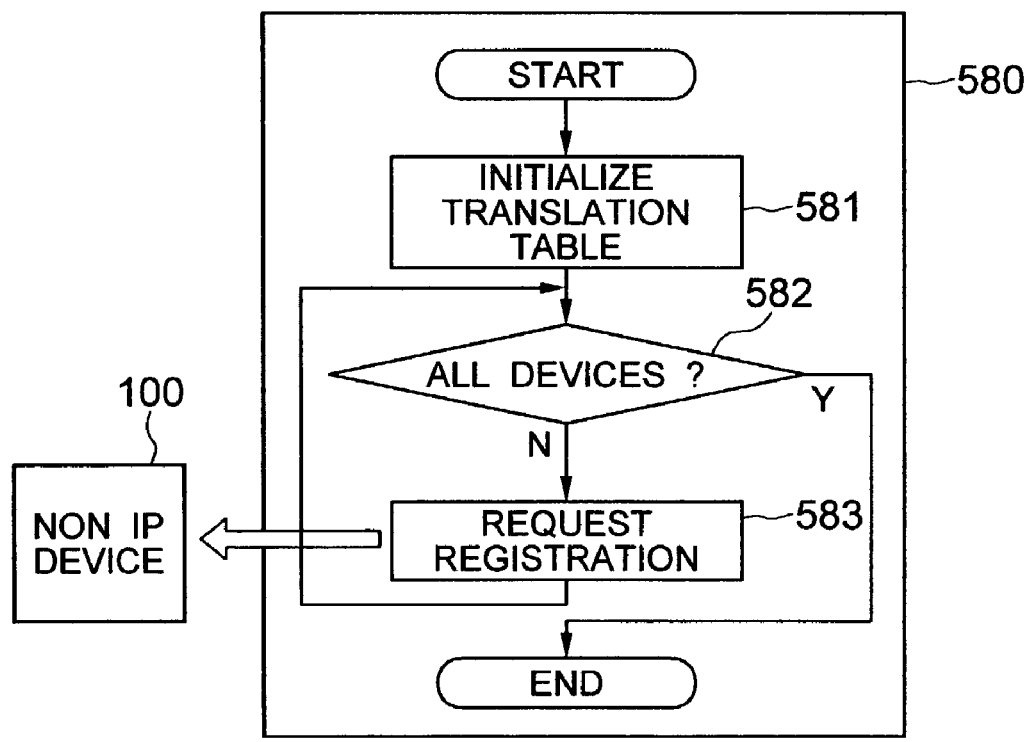
FIG. 13 is a flowchart showing a re-registration request process in the embodiment of the present invention.

In this connection, when the non-IP device connected to the non-IP network 200 is removed therefrom, the gateway 110 may a re-registration request process 580 (to be explained later with reference to FIG. 13) in place of the registration delete process 570.

In the re-registration request process 580, the gateway once deletes all translation records 910 registered in the translation table 400 (step 581). The gateway issues a registration request to all the non-IP devices 100 connected to the non-IP network 200. The non-IP device 100 when receiving the registration request performs the interface ID transmission process 510 (step 583). After processing the step 583 over all the non-IP devices 100 connected to the non-IP network 200, the gateway terminates its operation (step 582).

In the foregoing embodiment, explanation has been explained in connection with the example wherein the non-IP device 100 holds the interface ID 440 and, when the non-IP device 100 is connected to the non-IP network 200, the non-IP device 100 executes the interface ID transmission process 510 and then the translation table registration process 500 in the gateway 110, whereby always an identical IPv6 address can be allocated to the non-IP device 100. In accordance with another embodiment of the present invention, it is not always necessary to hold the interface ID 440. Explanation will be made as to the embodiment in the following.

Figure 14:
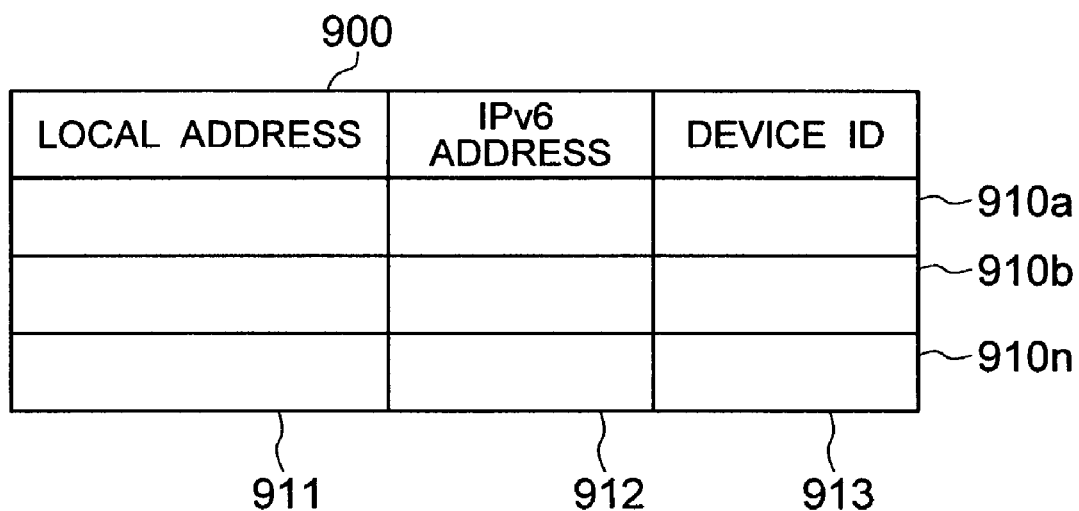
FIG. 14 is a diagram for explaining the data structure of the translation table in the embodiment of the present invention.

A translation table 900 to be used in place of the translation table 400 will first be explained with reference to FIG. 14.

The translation table 900 is composed of one or more translation records 910. Each translation record 910 is made up of a local address 911, an IPv6 address 912 and a device identifier 913. The local address 911 is the same as the local address 411 of the translation record 410 in the translation table 400. The IPv6 address 912 is the same as the local address 411 of the translation record 410 in the translation table 400. The device identifier 913 is information for identifying the non-IP device 100. The device identifier 913 is, for example, a manufacturer code, factory code, product code or manufacturing number defined by device object superclass properties of the ECHONET.

A plurality of translation records 910 are previously registered in the translation table 900. At this time, an IPv6 address is previously placed in the IPv6 address 912 of each translation record 910. The IPv6 address as used herein is created from the network ID of the IPv6 network 210 having the gateway connected thereto and a row of random or suitable numeric values. Registration of the translation table in the translation table 900 is only required to be executed at the time of initiating the gateway 110.

Figure 15:
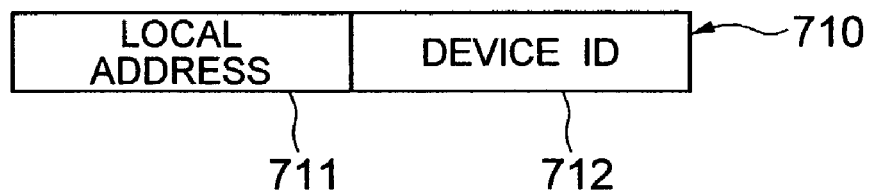
FIG. 15 is a diagram for explaining the data structure of registration data in the embodiment of the present invention.

Explanation will then be made as to registration data 710 to be used in place of the registration data 700, by referring to FIG. 15.

The registration data 710 is composed of a local address 711 and a device identifier 712. The local address 711 is the same as the local address 711 in the registration data 700. The device identifier 712, which is information for identifying the non-IP device 100, is, for example, a manufacturer code, business place code, produce code or manufacturing number defined by device object superclass properties of the ECHONET.

Figure 16:
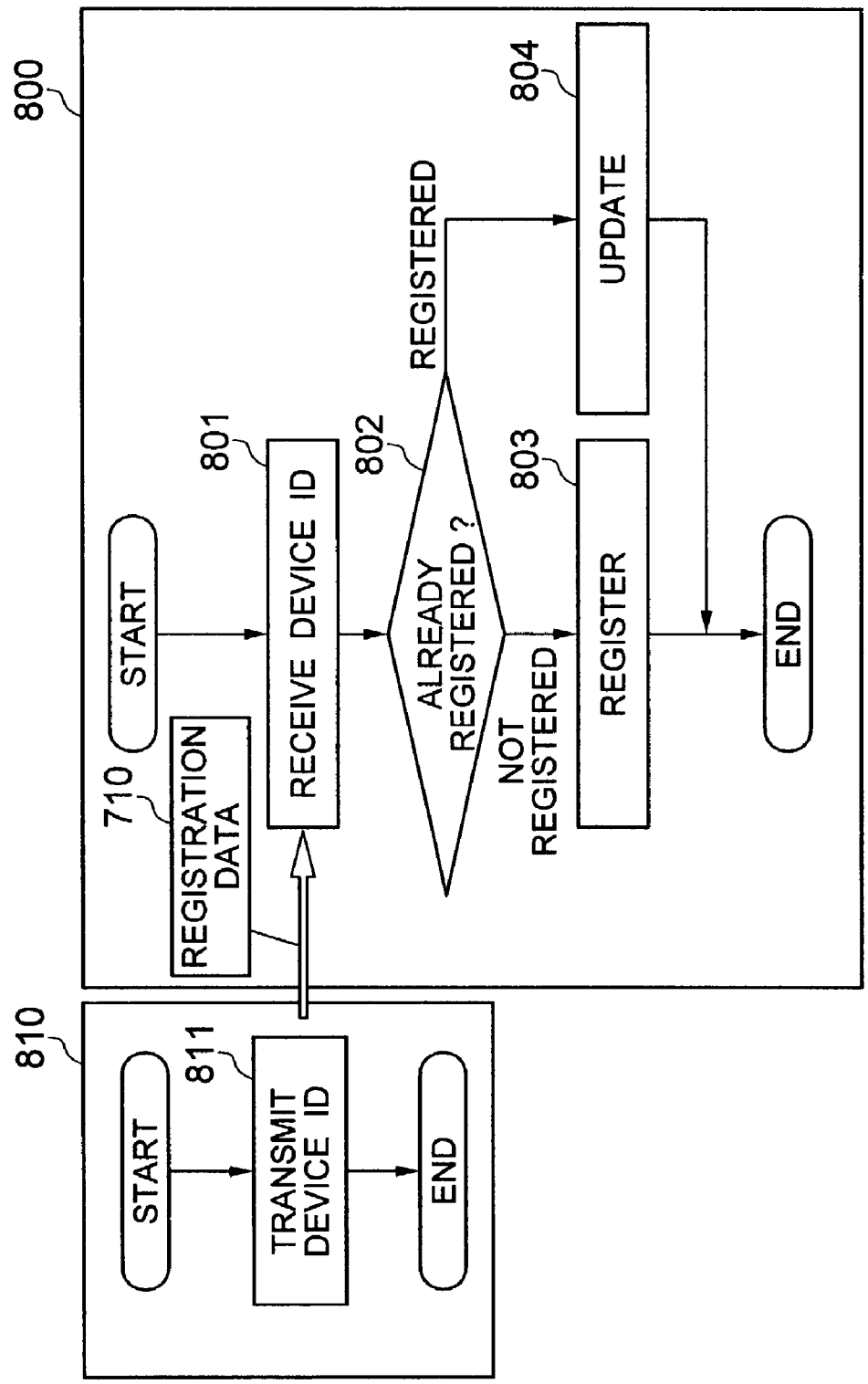
FIG. 16 is a flowchart showing a registration process in the embodiment of the present invention.

Explanation will next be made as to a device information transmission process 810 to be executed by the non-IP device 100 in place of the interface ID transmission process 510 when connected to the non-IP network 200 and as to a translation tail part registration process 800 to be executed by the gateway 110 in place of the translation table registration process 500, with reference to FIG. 16. The non-IP device 100, when connected to the non-IP network (or at any timing), performs the device information transmission process 810. In the device information transmission process 810, the non-IP device reads out the device identifier recorded in the memory 102 and sets it in the device identifier 712 of the registration data 710. The non-IP device 100 also acquires the local address of the non-IP device 100, e.g., from the communication controller 103 and sets it in the local address 711 of the registration data 710. And the non-IP device 100 transmits the registration data 710 as directed to the gateway 110 (step 811).

When the registration data 710 is transmitted from the non-IP device 100, the gateway 110 initiates the translation tail part registration process 800. In the translation tail part registration process 800, the gateway first receives the registration data 710 from the non-IP device 100 (step 801). The gateway next examines whether or not the translation record 910 having the same device identifier 913 as the device identifier 712 of the registration data 710 received in the step 801 is registered in the translation table 900 (step 802). When the translation record is already registered, the gateway sets the local address 711 of the registration data 710 received in the step 802 in the local address 911 of the translation record 910 having the same device identifier 913 as the device identifier 712 of the registration data 710 (step 806). When the translation record is not registered, the gateway searches the translation table 900 for the translation record 910 having the device identifier 913 not set yet in the table, sets the local address 711 of the registration data 710 received in the step 801 in the local address 911 of the searched translation record and sets the device identifier 712 in the device identifier 913, respectively.

In the NDP response process 530, the operation of the step 532 is modified so that the gateway examines whether or not the translation record 910 having the same IPv6 address 412 as the IPv6 address specified by the target address of the NS packet is present in the translation table 900. In the protocol transform process 550, further, the operation of the step 552 is modified so that the gateway searches the translation table 900 for the translation record 910 having the same IPv6 address 412 as the transmission destination IPv6 address included in the IPv6 header 461 of the read IPv6 data packet 460, and reads out the local address 911 of the searched translation record 910 therefrom.

When the non-IP device 100 connected to the non-IP network 200 was removed from the non-IP network, in the step 572 of the registration delete process 570, the gateway invalidates the local address 911 of the translation record 910 having the local address specified in the step 571. Or in the step 581 of the re-registration request process 580, the gateway invalidates all the local addresses 911 of the all translation records 910 registered in the translation table 900.

Through the above operations, as in the foregoing embodiment, mutual communication can be realized between the non-IP device 100 connected to the non-IP network 200 and the IPv6 device 150 connected to the IPv6 network or the portable phone 130 or personal computer 140 connected to the Internet. At this time, through the interface ID transmission process 510 and the translation table registration process 500 in the gateway 110, an identical IPv6 address can be always allocated to the non-IP device 100. Thus when an access is made from the IPv6 device 150 connected to the IPv6 network or from the portable phone 130 or personal computer 140 connected to the Internet to the non-IP device 100 located in the home, the communication can advantageously be realized always with use of the same IPv6 address.

Figure 9:
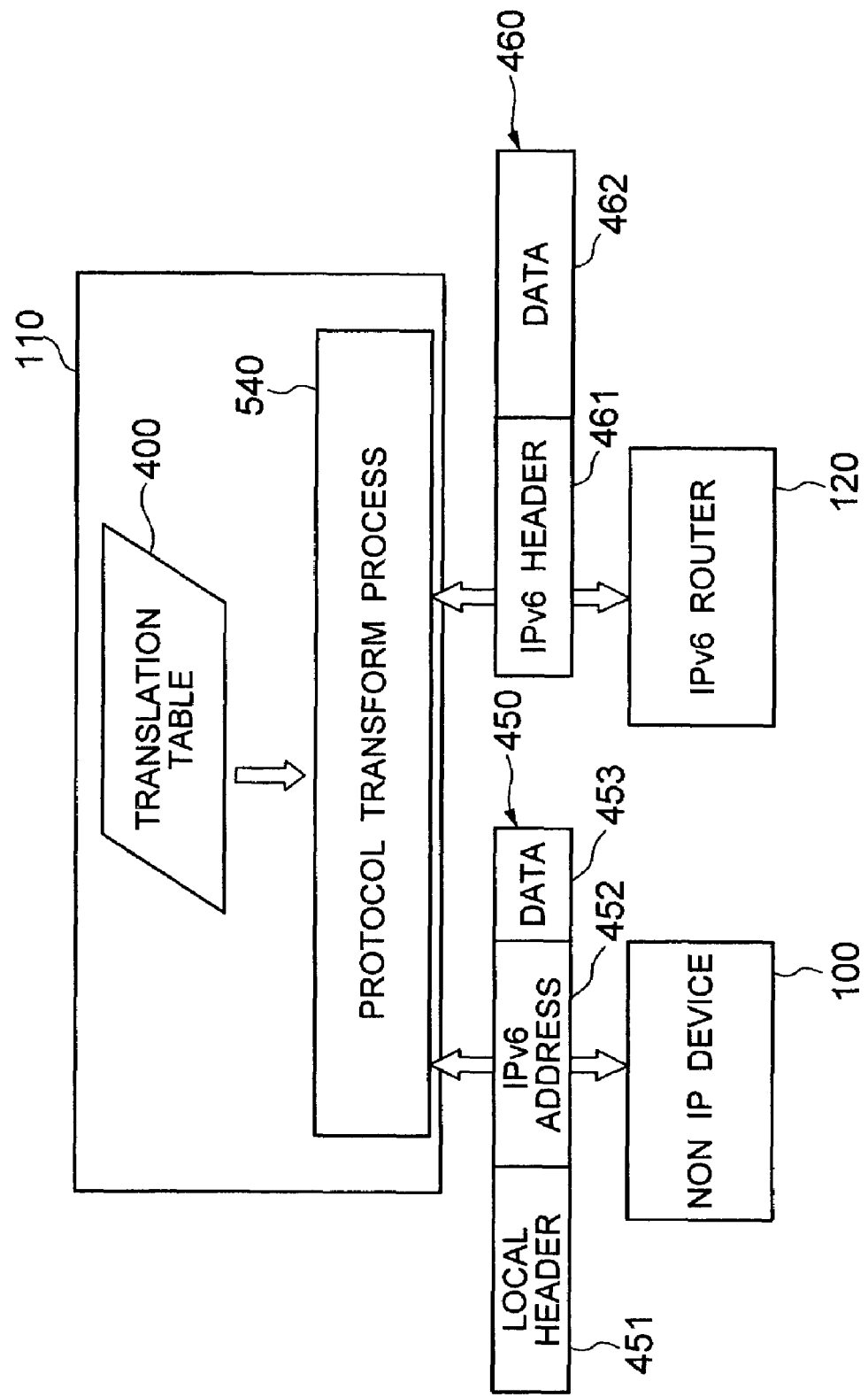
FIG. 9 is a diagram for explaining the summary of a protocol transform process in the embodiment of the present invention.

Another embodiment of the gateway 110 explained in connection with FIG. 9 will be explained with reference to FIGS. 19 and 20. The foregoing embodiment has been arranged so that, when the IPv6 address 452 of the IPv6 device 150 as the communication destination is placed in the local data packet 450, the non-IP device 100 can specify the IPv6 device 150. However, a local data packet 450a in the present embodiment does not include the above IPv6 address 452. Further, as shown in FIG. 20, in the present embodiment, a translation table 2000 having a connection identifier 2013 added thereto is used in place of the translation table 400. In the present embodiment, furthermore, the IP communication employs communication oriented type communication such as TCP.

Figure 21:
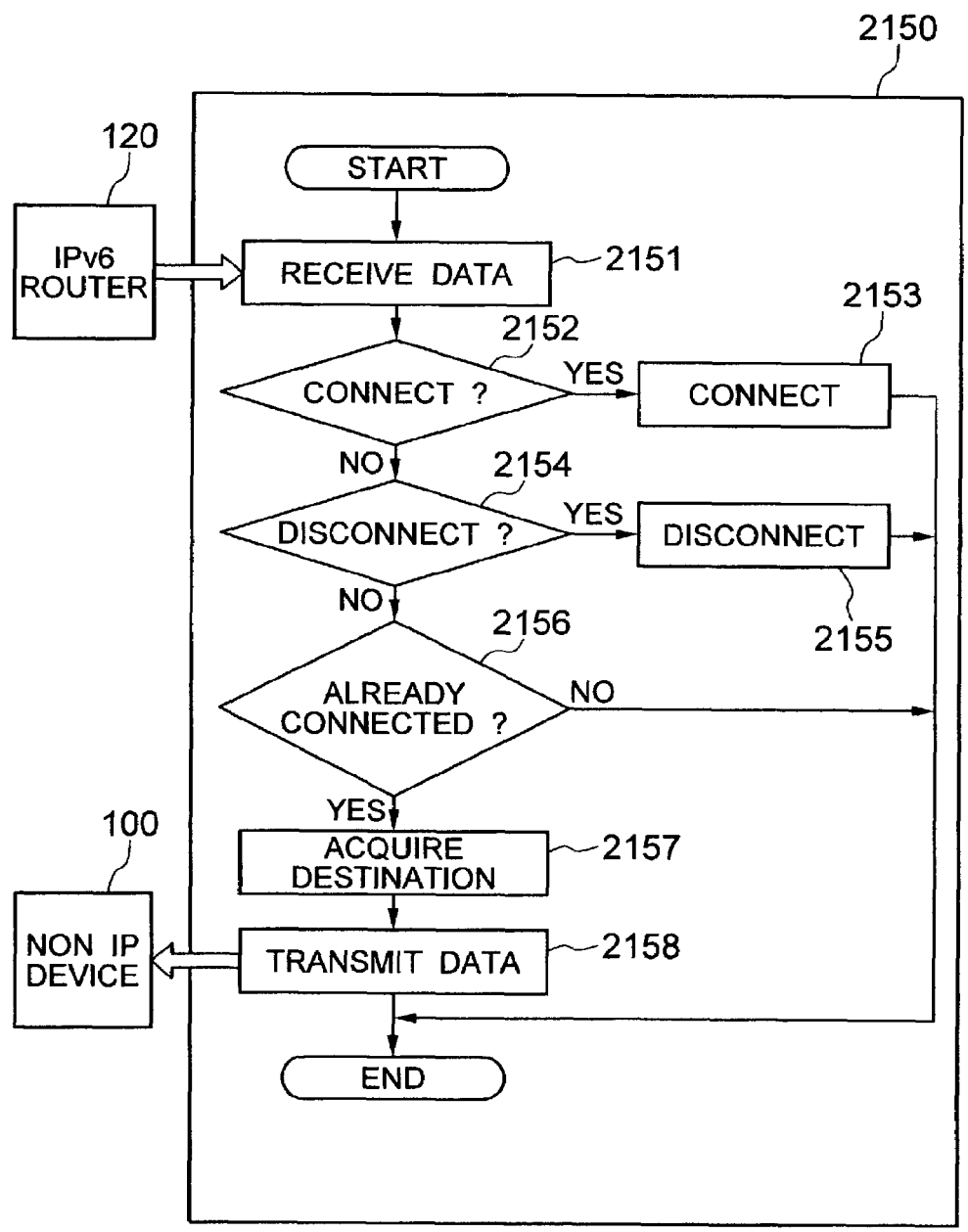
FIG. 21 is a flowchart showing the protocol transform process in the embodiment of the present invention.

Explanation will be made as to the operation of a protocol translation process 2150 from the IPv6 data packet 460 to the local data packet 450a in the present embodiment, with use of a flowchart of FIG. 21. The gateway first reads the IPv6 data packet 460 which arrived thereat (step 2151). The gateway then examines whether or not the IPv6 data packet 460 read in the step 2152 is a connection request. If the packet is the connection request, then the gateway executes the operation of the step 2153; whereas, if the packet is not the connection request, then the gateway executes the operation of the step 2153. In the step 2153, the gateway examines whether or not a translation record 2010 having the same IPv6 address 412 as the IPv6 address included in the IPv6 header 461 of the IPv6 data packet 460 is present in the translation table 2000. If the translation record is present in the table 2000, then the gateway performs the connecting operation and stores the connection identifier 2013 in the translation record 2010. Meanwhile, in the step 2154, the gateway examines whether or not the packet is a disconnection request, if the packet is a disconnection request, then the gateway deletes the connection identifier 2013 of the translation record 2010 in the step 2155. When determining in the step 2154 that the packet is not the disconnection request, the gateway examines the connection identifier 2013 of the translation record 2010 to judge whether or not the device is already connected in the step 2156. In the case of the absence, the gateway terminates its operation and proceeds to a step 2157. In the step 2157, the gateway reads out the local address 411 of the translation record 2010. The gateway then sets the local address 411 in the local header 451 of the local data packet 450 as a destination address. And the gateway stores data including at least part of the data 462 of the IPv6 data packet 460 or data obtained by processing the data 462 in the data 453 of the local data packet 450a, and transmits it to the non-IP network 200 (step 2158).

Figure 22:
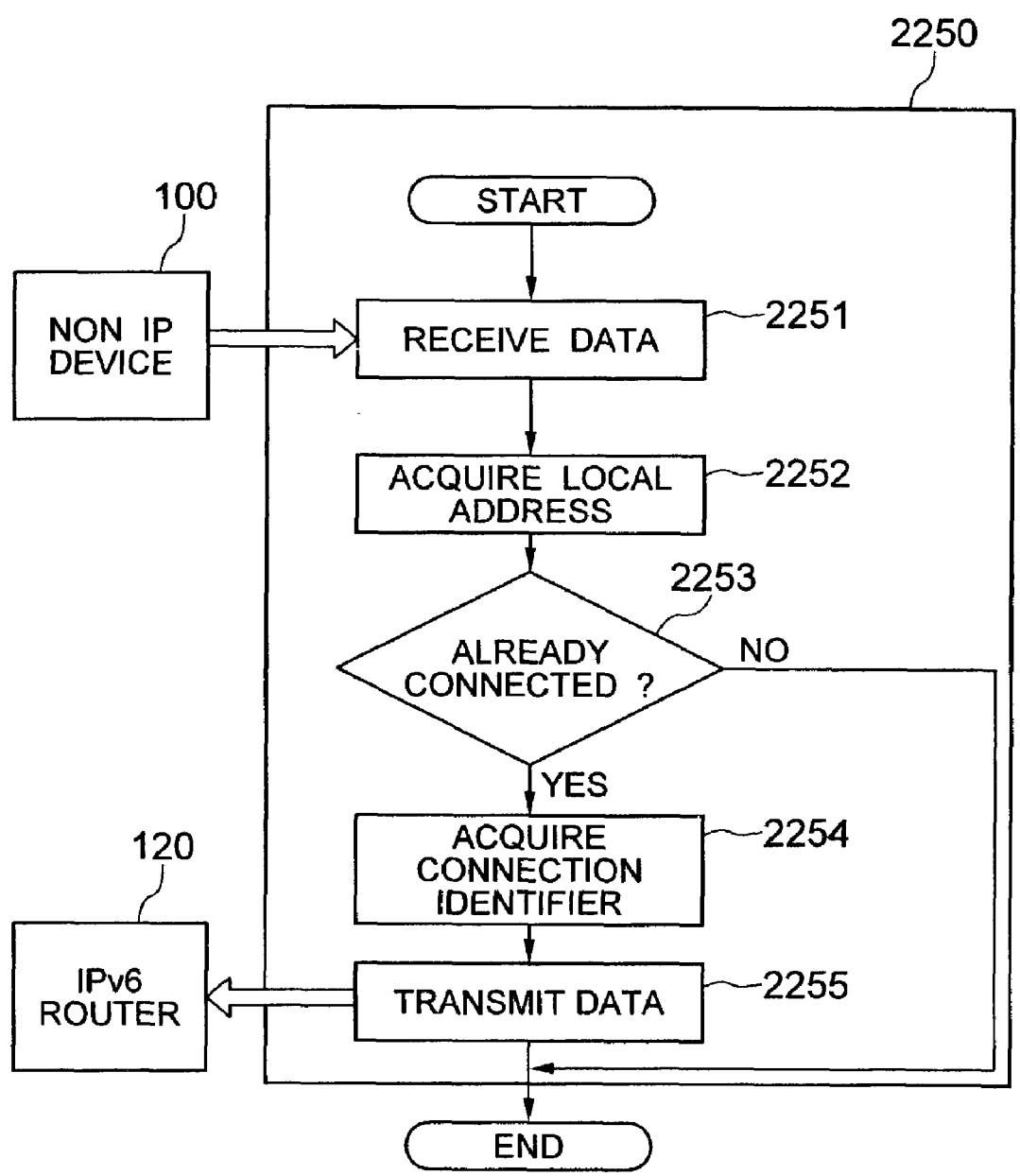
FIG. 22 is a flowchart showing the protocol transform process in the embodiment of the present invention.

Explanation will next be made as to the operation of a protocol translation process 2250 from the local data packet 450a to the IPv6 data packet 460, by referring to a flowchart of FIG. 22. The gateway first reads the local data packet 450a in a step 2251, and acquires the local address 411 of the local data packet 450a in a step 2252. In a next step 2253, the gateway searches for the translation record 2010 having the local address 411 included therein and examines the presence or absence of the connection identifier 2013 in the translation record 2010. In the case of the absence of the identifier, the gateway determines that the connection is already established and terminates its operation. If the connection identifier 2013 is present, then the gateway acquires the connection identifier 2013 and the corresponding IPv6 address 412 in a subsequent step 2254, and transmits data to a connection identified by the connection identifier 2013 and IPv6 address 412 in a step 2255. At this time, the IPv6 address of the destination corresponding to the connection identifier and the IPv6 address 412 of the transmission source are set in the IPv6 header 461.

As has been explained above, the present embodiment is arranged so that, the IPv6 device 150 communicates with the non-IP device 100 via the gateway 110, a connection between the IPv6 device 150 and gateway 110 is previously established in the form of connection oriented type IP connection. As a result, a communication can advantageously be realized between the non-IP network 200 having a narrow address space and the IPv6 network 210 or IPv6 network 230 having a broad address space when compared to the IPv6 without causing any collision, etc. caused by overlap of the translation address. As advantages, further, it can be made unnecessary to put the IPv6 address 452 of the communication destination in the local data packet 450 on the non-IP communication side, and it can be made unnecessary to modify an existing IP communication protocol or application software or middle software using the protocol.

Figure 17:
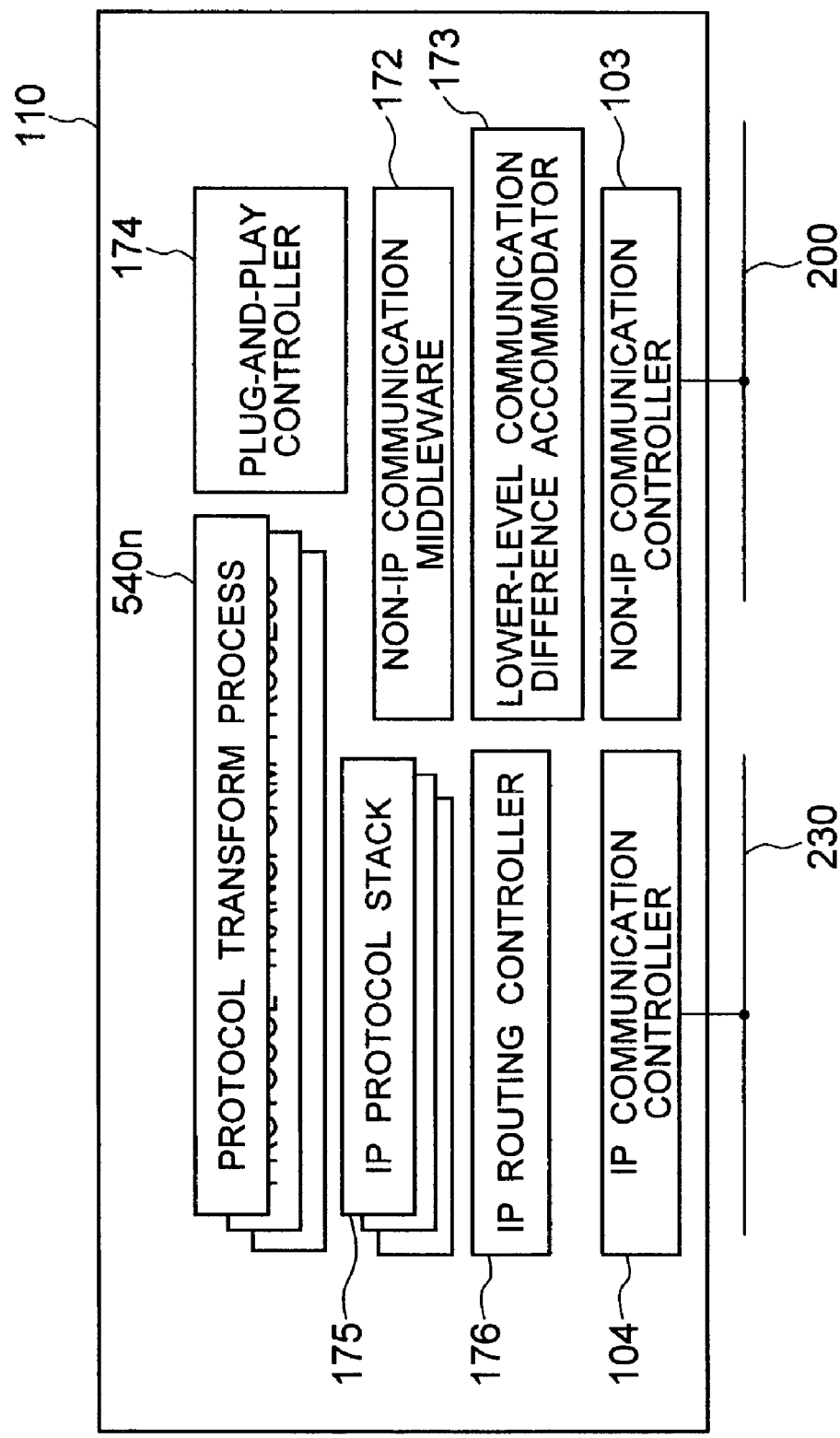
FIG. 17 is a diagram for explaining the program structure of the gateway in the embodiment of the present invention.

The program structure and operation of the gateway 110 will be explained in detail with reference to FIG. 17. Reference numeral 173 denotes a lower-level communication difference accommodator which accommodates a difference between different types of communication controllers 103 to a common upper-level interface. Numeral 172 denotes a non-IP communication middleware which performs protocol operation such as data transmission and reception of non-IP communication or node detection. Numeral 175 denotes an IP protocol stack which performs protocol operation for IPv6 communication, protocol operation for TCP connection or connection management. In the present embodiment, the IP protocol stack 175 is operated as a plurality of processes or threads independent for each IP address. Numeral 176 denotes an IP routing controller which examines the IP address stored in the header of an IPv6 packet received from the IP communication controller 104 and passes the received IP packet to the IP protocol stack 175 corresponding to the IP address. Numeral 540n denotes the aforementioned protocol transform process 540 or protocol transform process 540a. Numeral 174 denotes a plug-and-play controller which detects the connection or disconnection of the non-IP device 100 to or from the non-IP network 200 and performs setting operations necessary for the protocol transform process 540n.

The plug-and-play controller 174, when detecting the connection of the non-IP device 100 to the non-IP network 200 by means of the aforementioned IP communication middleware, generates the IPv6 address 412 or 912 at the unit shown in the foregoing embodiment, and adds it to the translation record 410 of the translation table 400, the translation record 910 of the translation table 900, or the translation record 2010 of the translation table 2000. After the addition, the controller initiates the process or thread of the protocol transform process 540n. In the protocol transform process 540n, the controller initiates the process or thread of the IP protocol stack 175 associated with the generated IPv6 address 412 or 912, and the process is put in its connection wait state. Meanwhile, the plug-and-play controller 174, when detecting the disconnection of the non-IP device 100 from the non-IP network 200 through the non-IP communication middleware, relieves the connection wait state, terminates the process or thread of the IP protocol stack 175, and terminates the process or thread of the protocol transform process 540n. Thereafter, the controller relieves the translation record 410 of the translation table 400, the translation record 910 of the translation table 900, or the translation record 2010 of the translation table 2000. Through the above operations, the connection/disconnection state of the non-IP device 100 to/from the non-IP network 200 advantageously looks as if the connection/disconnection of the IPv6 device 150 was done from the IPv6 network 230 side.

The protocol transform process 540n may be made in the form of a program common to all the non-IP devices 100 or, when the conversion contents of the non-IP devices 100 are different for each of the types of the devices, the process may be made in the form of different programs. Further, it is not always necessary to divide the process or thread.

Figure 18:
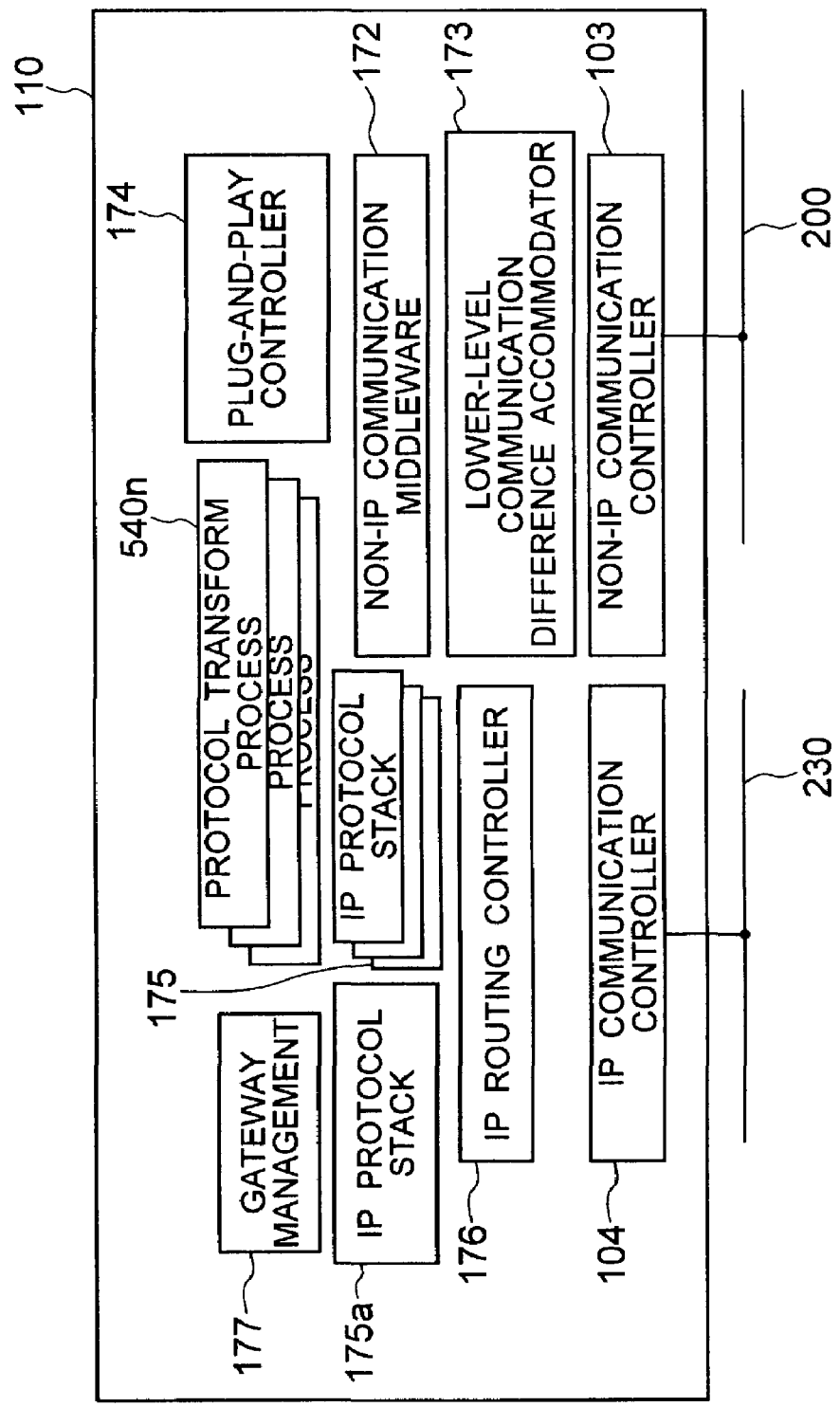
FIG. 18 is a diagram for explaining the program structure of the gateway in the embodiment of the present invention.

Shown in FIG. 18 is an example wherein an IPv6 address is allocated to the gateway 110 itself so that the gateway 110 can be controlled from the IPv6 network.230 side. Reference numeral 175a denotes an IP protocol stack for processing an IPv6 packet to the IPv6 address of the gateway 110 itself, and numeral 177 denotes a gateway management program for controlling the gateway 110 or transmitting the state of the gateway 110 in accordance with data received from the IP protocol stack 175a.

In the foregoing embodiments, explanation has been made in connection with the IPv6 and ECHONET as exemplary different communication protocols. However, it will be clear that the foregoing embodiments can be easily applied to a gateway between a first communication protocol using destination and transmission source addresses of n bits and a second communication protocol using destination and transmission source addresses of m bits.

In the foregoing embodiments, further, explanation has been made in connection with the case where the communication transmission medium is divided into the IPv6 network 230 and the non-IP network 200 physically separated. However, it will be obvious that the foregoing embodiments can be applied as the gateway between protocol communication packets of different protocols flowing on the same transmission line.

As has been explained in the foregoing, in accordance with the present invention, a non-IP device (such as an air conditioner connected to the ECHONET in the home) can communicate with a portable phone or personal computer connected to the Internet with use of the IPv6 protocol. In this case, the addresses of the non-IP devices to be connected to the IPv6 network are the same, so long as the gateway connected to the non-IP devices is not changed. Therefore, the identifier of the device can be advantageously facilitated. Further, a portable phone or personal computer can advantageously communicate with a non-IP device with use of the same IPv6 address at all times.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A gateway device comprising:
a first communication unit for connecting a first network to perform data transmission and reception to and from said first network;
a second communication unit for connecting a second network to perform data transmission and reception to and from said second network with use of an IP protocol;
a unit for acquiring an interface ID of a device connected to said first network and a local address of the device in said first network;
a unit for acquiring a network ID of said second network;
an address translation unit for generating an IPv6 address from said interface ID and network ID and managing a correspondence relation between the generated IPv6 address and said local address; and
an NDP response unit for examining whether or not an IP address specified in a target address within an NS (neighbor solicitation) packet prescribed in an NDP (neighbor discovery protocol) when received from said second network is present in an IPv6 address controlled by said address translation unit, and when the IPv6 address is present, for returning an NA (neighbor advertisement) packet thereto,
whereby the device connected to the first network can communicate with the device connected to said second network.

2. A gateway device comprising:
a first communication unit for connecting a first network to perform data transmission and reception to and from said first network;
a second communication unit for connecting a second network to perform data transmission and reception to and from said second network with use of an IP protocol;
a unit for acquiring first identifier information for identifying a device connected to said first network and second identifier information of said device in said first network;
a unit for acquiring a network ID of said second network;
a management table for managing a correspondence relation between an IP address and said first and second identifier information;
a unit for generating a plurality of IPv6 addresses from said network ID and registering them in said management table; said management table being arranged so that identical first identifier information is associated with the IPv6 addresses at all time in said management table, and
an NDP response unit for examining whether or not the IPv6 address specified by a target address within an NS (neighbor solicitation) packet prescribed by an NDP (neighbor discovery protocol) when received from said second network is present in the IP addresses managed by an address translation unit and, when the packet is present, for returning an NA (neighbor advertisement) packet,
wherein communication can be realized between the device connected to said first network and the device connected to said second network.

3. A gateway device for enabling communication between a first information processor based on a first network communication protocol using a destination address and transmission source address of n bits and a second information processor based on a second network communication protocol using a destination address and transmission source address of m bits (m<n), comprising:
a virtual address allocation unit for allocating a virtual address of n bits to said second information processor;
a unit for receiving a connection oriented type communication connection request conforming to said first network communication protocol transmitted from said first information processor with use of said virtual address as a destination address and for establishing a communication connection;
a translation table unit to store a connection identifier for identifying said communication connection, said virtual address, and the m-bit address of said second information processor, to provide an association among said connection identifier, said virtual address, and said m-bit address; and
a unit, after said communication establishment, for receiving data transmitted based on said first network communication protocol from said first information processor with use of said virtual address as its destination, converting said data to data conforming to said second network communication protocol, and for transmitting said converted data to said second information processor according to said second network communication protocol with use of the m-bit address associated with said virtual address by said translation table unit as an destination address of said second network communication protocol.

4. A gateway device for enabling communication between a first information processor based on a first network communication protocol using a destination address and transmission source address of n bits and a second information processor based on a second network communication protocol using a destination address and transmission source address of m bits (m<n), comprising:

a virtual address allocation unit for allocating a virtual address of n bits to said second information processor;

a unit for receiving a connection oriented type communication connection request conforming to said first network communication protocol transmitted from said first information processor with use of said virtual address as a destination address and for establishing a communication connection;

a translation table unit to store a connection identifier for identifying said communication connection, said virtual address and the m-bit address of said second information processor, to provide an association among said connection identifier, said virtual address, and said m-bit address; and a unit, after said communication establishment, for receiving data transmitted based on said second network communication protocol from said second information processor with use of the m-bit address of said gateway device as its destination address and with use of the m-bit address of said second information processor as a transmission source address, converting said data to data conforming to said first network communication protocol, and transmitting said converted data to said first information processor according to said first network communication protocol with respect to the connection wherein said communication connection identified by said connection identifier associated with the m-bit address of said second information processor by said translation table unit is established.

5. A method for controlling a gateway device for enabling communication between a first information processor based on a first network communication protocol using a destination address and transmission source address of n bits and a second information processor based on a second network communication protocol using a destination address and transmission source address of m bits (m<n), comprising the steps of:

allocating an n-bit virtual address to said second information processor;

receiving a connection oriented type communication connection request transmitted with said virtual address as a destination and based on said first network communication protocol from said first information processor and establishing a communication connection;

storing a connection identifier for identifying said communication connection, said virtual address, and the m-bit address of said second information processor in a translation table, to provide an association among said connection identifier, said virtual address, and said m-bit address; and after said communication is established, receiving data transmitted based on said first network communication protocol from said first information processor with use of said virtual address as a destination, converting said data to data conforming to said second network communication protocol, and transmitting said converted data to said second information processor based on said second network communication protocol with use of the m-bit address associated with said virtual address using said translation table as the destination address of said second network communication protocol.

6. A method for controlling a gateway device for enabling communication between a first information processor based on a first network communication protocol using a destination address and transmission source address of n bits and a second information processor based on a second network communication protocol using a destination address and transmission source address of m bits (m<n), comprising the steps of:

allocating an n-bit virtual address to said second information processor;

receiving a connection oriented type communication connection request transmitted with said virtual address as a destination and based on said first network communication protocol from said first information processor and establishing a communication connection;

storing a connection identifier for identifying said communication connection, said virtual address, and the m-bit address of said second information processor in a translation table, to provide an association among said connection identifier, said virtual address, and said m-bit address; and after said communication is established, receiving data transmitted based on said second network communication protocol from said second information processor with use of m-bit address of said gateway device as a destination and the m-bit address of said second information processor as a transmission source address, converting said data to data conforming to said first network communication protocol, and transmitting said converted data to said first information processor based on said first network communication protocol with respect to a connection wherein said communication connection identified by said connection identifier associated with the m-bit address of said second information processor in said translation table step is established.

\* \* \* \* \*